United States Patent [19]

Sherfinski et al.

[11] Patent Number: 4,624,626
[45] Date of Patent: Nov. 25, 1986

[54] VENTURI ODOR DISSIPATOR

[75] Inventors: David A. Sherfinski; William J. Raasch, both of Wausau, Wis.

[73] Assignee: Sherfinski & Raasch Water Systems, Inc., Wausau, Wis.

[21] Appl. No.: 709,564

[22] Filed: Mar. 8, 1985

[51] Int. Cl.⁴ .......................... F04F 5/04; F04B 23/08
[52] U.S. Cl. ..................................... 417/87; 417/313; 261/DIG. 75; 422/124
[58] Field of Search ................. 261/DIG. 75; 417/87, 417/313; 98/42.05; 422/124

[56] References Cited

U.S. PATENT DOCUMENTS

| | | |
|---|---|---|
| 1,466,685 | 9/1923 | Warner . |
| 1,488,987 | 4/1924 | Hulsey . |
| 1,499,690 | 7/1924 | Pine et al. . |
| 1,548,805 | 8/1925 | Mowrey . |
| 1,574,292 | 2/1926 | Kelley . |
| 1,832,346 | 11/1931 | Yerkes et al. . |
| 1,840,493 | 1/1932 | Dyer et al. . |
| 1,971,270 | 8/1934 | McGregor . |
| 2,306,560 | 12/1942 | Pendleton . |
| 2,371,846 | 3/1945 | Ruthven . |
| 2,840,119 | 6/1958 | Gavin .................................. 417/87 |
| 3,042,981 | 7/1962 | DiLione ............................. 422/124 |
| 3,244,112 | 4/1966 | Parkin . |
| 3,265,370 | 8/1966 | Scholfen ................................ 261/3 |
| 3,640,516 | 2/1972 | Willinger .................... 261/DIG. 75 |
| 3,904,393 | 9/1975 | Morse ......................... 261/DIG. 75 |
| 4,072,612 | 2/1978 | Daniel ................................ 210/220 |
| 4,179,375 | 12/1979 | Smith .......................... 261/DIG. 75 |
| 4,271,099 | 6/1981 | Kukla .......................... 261/DIG. 75 |
| 4,274,959 | 6/1981 | Roediger ............................ 209/170 |
| 4,478,765 | 10/1984 | Tubbs ......................... 261/DIG. 75 |

FOREIGN PATENT DOCUMENTS 2059790 4/1981 United Kingdom ....... 261/DIG. 75

Primary Examiner—William L. Freeh
Attorney, Agent, or Firm—Willian Brinks Olds Hofer Gilson & Lione Ltd.

[57] ABSTRACT

A well deodorizing apparatus includes a checkvalve which provides unidirectional flow in a pump discharge pipe and a tap upstream from the checkvalve to divert a fraction of the pump discharge and direct it through a venturi orifice. The venturi effect atomizes the diverted water resulting in a pressure decrease in a mixing chamber. Ambient air is drawn into the mixing chamber and intermixed with the atomized water. The resultant mixture of air and water is directed back into the ground water reservoir thereby oxygenating the ground water and deodorizing the well.

13 Claims, 4 Drawing Figures

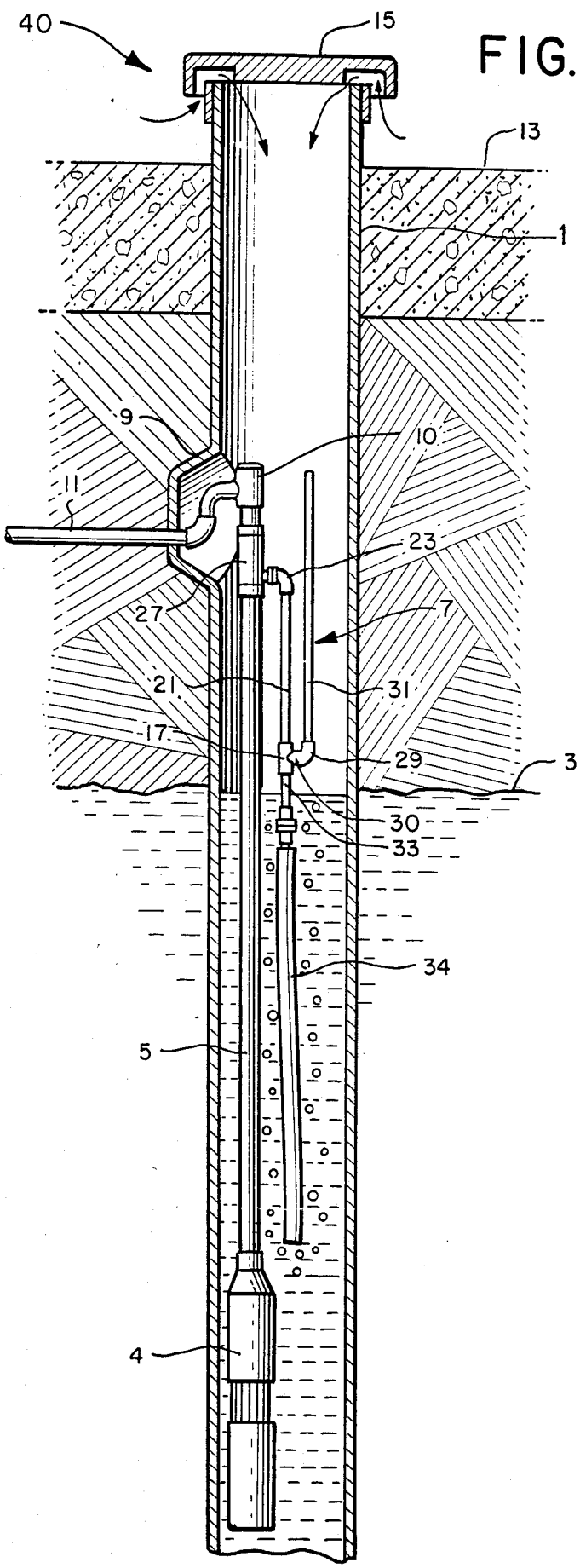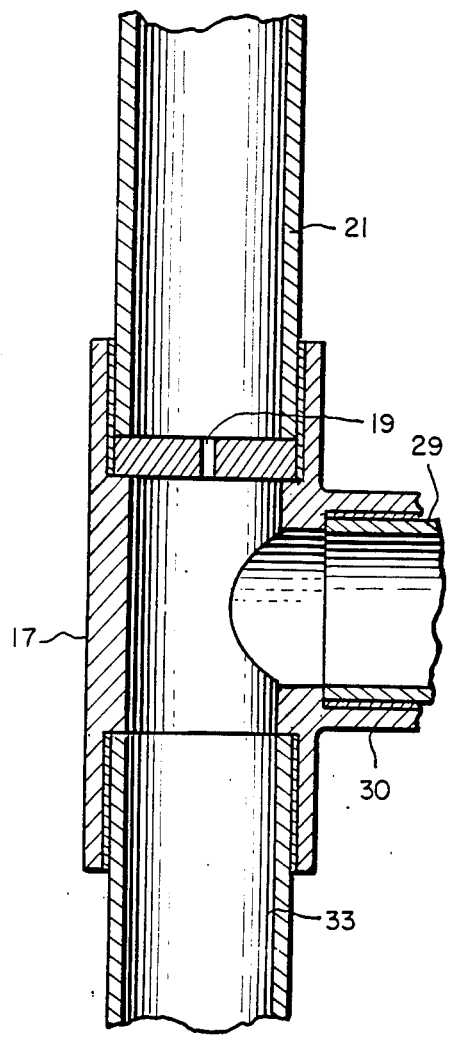
FIG. 1
FIG. 4

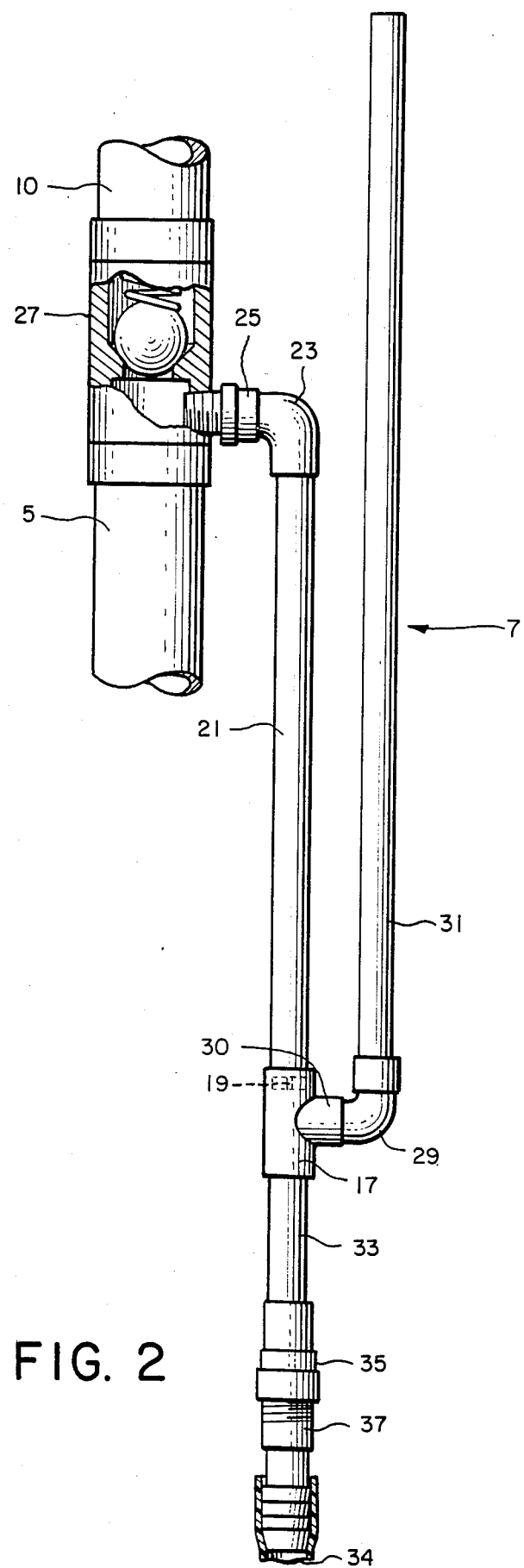
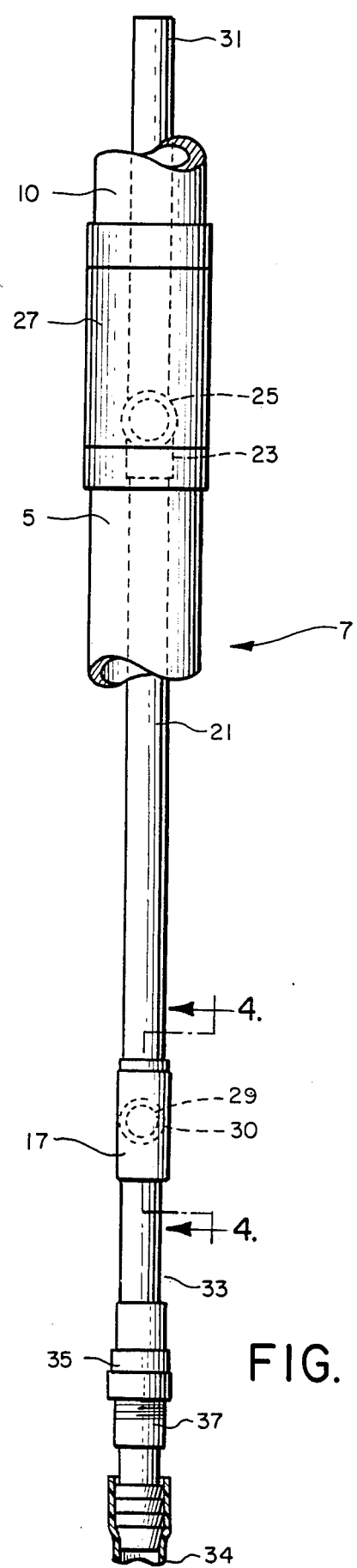
FIG. 2
FIG. 3

VENTURI ODOR DISSIPATOR

FIELD OF THE INVENTION

The invention relates to devices which intermix fluids and gases. More particularly, the invention relates to the dissipation of odors within wells by the intermixing of ground water and air.

BACKGROUND OF THE INVENTION

In many areas where municipal utilities do not provide water, users must rely on subterranean wells for their needs. The ground waters found in these wells often contain dissolved minerals, such as sulfur. These waters can emit an unpleasant odor caused by the escape of dissolved gases, such as sulfur dioxide. These gases normally escape from within the well casing through openings in the well cap, causing localized stenches.

A method for preventing the buildup and concentration of these noxious gases within the well casing and for improving the overall quality of the well water is desirable. It is known in the art to treat sulfurous waters by mixing potassium manganate with the well water. Such methods require separate pumps and mixing tanks. In addition, potassium manganate is a hazardous substance that requires careful handling. It is therefore an object of the invention to provide a safe means for dissipating well odors and improving water quality in a manner that requires minimal capital expenditure and no maintenance.

It is also known in the art to use venturi type devices to aerate bodies of fluids. U.S. Pat. No. 4,271,099 issued to Kukla on June 2, 1981 discloses a venturi device which is placed in the main discharge line of a pump and operates to aerate fish tanks and the like. Because the known devices conduct the full pump discharge, the venturi restriction may impose limits on water flow which are less than a given pump's rated capacity. The structure of the known devices is also not conducive to operation within a well casing. It is therefore a further object of the invention to increase the quality of the water discharged from the well by increasing the amount of dissolved air in relation to the noxious gases without affecting the rate of discharge of the pump.

SUMMARY OF THE INVENTION

In order to achieve the objects of the invention, a portion of the pump discharge is diverted through a venturi device. Pressure reduction causes ambient air to be drawn into a chamber where the water and air are mixed and returned to the water reservoir. The intake of air into the venturi device causes outside air to be drawn into the well casing, thus reducing the concentration of malodorous gases and preventing the buildup of unpleasant odors. A portion of the fresh air dissolved in the return water eventually reaches the user, thereby increasing the quality of the water. When the pump is inactive a check valve prevents water from flowing back through the device and into the well.

BRIEF DESCRIPTION OF THE DRAWINGS

FIG. 1 illustrates the placement of the venture odor dissipator within a typical well casing.

FIG. 2 is a front view of the preferred embodiment of the invention.

FIG. 3 is a side view of the venturi odor dissipator shown in FIG. 2.

FIG. 4 is an enlarged cross sectional view of the venturi orifice taken on the line 4—4 in FIG. 3.

DETAILED DESCRIPTION OF THE INVENTION

FIG. 1 illustrates a typical well and pump configuration in which the odor dissipator 7 has been installed. The well is lined by a well casing 1 which extends below the water table 3. A submersible pump 4 is located at the bottom of the well, below the water table. A main discharge pipe 5 carries water from the pump toward the surface. The odor dissipator 7 is located near a part of the well casing known as the pitless adapter 9. A second portion of pipe 10 carries water out of the dissipator 7 to an elbow where the flow is directed out of the well casing by a pipe 11. The well casing 1 terminates above ground level 13 in a well cap 15 which prevents debris from falling down the well, yet allows gases to flow into and out of the casing.

As shown in FIG. 2, the odor dissipator 7 generally consists of three tubular members connected to one common fitting. In the preferred embodiment, the common fitting is a standard ½ inch copper "T" fitting 17 and the tubular members are ½ inch copper pipe. Unless otherwise specified herein, all connecting fittings are made of copper and all connections are accomplished by soldering the copper pipe to the appropriate fitting.

As shown in FIG. 4, a stainless steel orifice 19 is connected to the nipple of one run end of the "T" fitting. In the preferred embodiment, the opening of orifice 19 is ⅛ inch. A tubular member 21 is inserted in the same nipple as orifice 19 and soldered in place. The opposite end of the tubular member 21 is connected to an elbow member 23. The elbow is also connected to a brass adapter element 25 which is threaded into a hole in a flow restricting device 27 which allows fluid to pass in only one direction. In the preferred embodiment, the flow restricting device is a spring loaded check valve. It should be noted that the adapter 25 is connected to the flow restricting device 27 so that it is located upstream from the fluid restricting means within device 27 when fluid is flowing in the discharge pipe 5.

A second elbow 29 is connected to the branch opening 30 of the "T" fitting. A tubular member 31 is connected to elbow 29 in such a way that the ends of tubular members 21 and 31 not connected to the "T" fitting extend in the same direction. For reasons to be explained later, the combined length of the check valve and tubular member 21 when connected to the "T" fitting must not extend beyond the unconnected end of tubular member 31. In the preferred embodiment, tubular member 31 extends at least 3 inches beyond the end of the check valve that is farthest from the "T" fitting.

A third tubular member 33 is connected to the second run end of the "T" fitting. As shown in FIG. 2, tubular member 33 is relatively shorter than tubular members 21 and 31. In the preferred embodiment, member 33 is 2¼ inches. The end of member 33 opposite the "T" fitting is connected in a suitable fashion to a discharge pipe 34 as shown in FIG. 1. In the preferred embodiment of the device, a copper female adaptor 35 is soldered to member 33 and a male nylon adapter 37 is inserted. In the preferred embodiment, PVC tubing is used to direct the mixture of air and fluid back down to the vicinity of the submerged pump.

In operation, the odor dissipator is placed within a well casing as shown in FIG. 1, and connected to the pump discharge pipe in such a manner that water is allowed to flow from the pump to the surface when the pump is activated, and stopped from flowing back down the pipe when no water is required and the pump is deactivated. In this manner, the pipe from the odor dissipator to the user is always full of water, which becomes immediately available at the sink or other appliance when the pump is activated. In addition, the fluid restricting device 27 prevents the water in the pipe from flowing back through the odor dissipator 7.

When a demand for water exists, the pump 4 is activated causing water to flow up the discharge pipe 5. As the water passes through the check valve 27, a portion is diverted through the opening in the adapter 25. This diverted flow is directed back toward the bottom of the well through tubular member 21. The pressurized flow is restricted at the orifice of the insert member 19. In a manner common to all venturi devices and known to the art, the water passing through the orifice undergoes a drop in pressure causing the fluid to atomize. The pressure reduction also causes air to be drawn through tubular member 31 into the "T", where it is mixed with the atomized fluid. The mixture of water and air is further mixed in tubular member 33.

The mixture of water and air is conducted below the surface of the water table by the discharge pipe 34 where a portion of the mixture is drawn into the pump for discharge into the main pipe. In the above described manner, the well water pumped to the house contains a higher percentage of dissolved atomspheric gases, resulting in a perceptable reduction in sulfurous odors, and more potable water for domestic use. A further benefit is obtained through the removal of gases within the well casing through the pump. As the gases are removed through the tubular member 31, fresh air is drawn into the well casing as shown in FIG. 1 at 40, thus establishing an air flow within the well casing. The incoming fresh air causes the well odors to be exhausted through the well cap, which eventually results in less sulfur odor near the area of the well cap.

A further feature of the invention lies in the relative length of tubular member 31 with respect to the combined lengths of tubular member 21 and check valve 27. It has been found that if tubular member 31 is too short, the atomized water will be expelled from tubular member 31 rather than causing a vacuum and drawing the well gases into the odor dissipator.

As shown in FIG. 1, the odor dissipator 7 is positioned within the well casing 1 near the pitless adapter 9. As is known in the art, the pitless adapter is welded to the well casing, thus requiring the pitless adapter to be located at or above the water table. However, it is not uncommon for the water level 3 within the well to fluctuate. Although this fluctuation is typically only a few inches, where the pitless adapter has been positioned at the water level, these fluctuations could render the odor dissipator inoperable. The extension of tubular member 31 beyond the check valve ensures that the open end of tubular member 31 is above the water level for most anticipated fluctuations.

The invention may be embodied in other specific forms without departing from its spirit or essential characteristics. The present embodiment is, therefore, to be considered in all respects as illustrative and not restrictive, the scope of the invention being indicated by the claims rather than by the foregoing description. All changes which come within the meaning and range of the equivalents of the claims are intended to be embraced therein.

We claim:

1. A device for intermixing gas and liquid from a liquid source to deodorize the liquid, comprised of;
   valve means for providing a unidirectional flow of said liquid from said liquid source;
   diverting means for diverting a fraction of the unidirectional flow of said liquid;
   means for atomizing said diverted fraction of said unidirectional flow of liquid;
   means for mixing said atomized liquid and said gas; and
   discharge means for discharging the mixture of said gas and said atomized liquid into said liquid source to deodorize and aerate the liquid.

2. The apparatus of claim 1 wherein said valve means is a spring loaded check valve, and said means for atomizing is an orifice.

3. The apparatus of claim 2 wherein said diverting means is located upstream from said valve means so that fluid is prevented from flowing back through the device when said unidirectional flow of liquid ceases.

4. An apparatus for deodorizing a subterranean well comprised of:
   pump means for pumping fluid from a fluid reservoir;
   discharge pipe means for directing fluid away from said pump;
   valve means for providing unidirectional fluid flow in said discharge pipe;
   access means located upstream from said valve means for removing some fraction of said unidirectional fluid flow;
   first pipe means connected to said access means for directing said fraction of said unidirectional flow parallel to and opposite from said unidirectional flow;
   connection means attached to said first pipe means at a first run end;
   restricting means, securably attached within said connection means and adjacent to said first pipe means for atomizing the fluid flowing therein;
   second pipe means, relatively longer than said first pipe means, attached at one end to a branch opening of said connection means and extending beyond said valve means so that when the fluid in said first pipe means is atomized, the resultant pressure decrease will draw ambient air down and through said second pipe means into said connection means,
   third pipe means connected to a second run end of said connection means for mixing said atomized fluid and said ambient air; and
   discharge means connected to said third pipe means said for directing the mixture of ambient air and said atomized fluid into said fluid reservoir of said subterranean well.

5. The apparatus of claim 4 wherein said first, second, and third pipe means are copper tubing, and said connection means is a copper "T" fitting.

6. The apparatus of claim 4 wherein said first, second, and third pipe means are PVC tubing, and said connecting means is a PVC "T" fitting.

7. The apparatus of claim 4 wherein said valve means is a spring loaded check valve.

8. The apparatus of claim 7 wherein said access means is located within the body of said check valve.

9. The apparatus of claim 4 wherein said restricting means is a stainless steel body with a circular orifice.

10. The apparatus of claim 9 wherein said orifice in ⅛ inch in diameter.

11. In a system for intermixing liquids and gases in subterranean wells consisting of a pump and discharge pipe for removing liquids in said well, and an aerating device including a first pipe connected to said pump discharge pipe, a venturi to atomize said liquid in said first pipe, a second pipe connected at one end to said first pipe at a point downstream from said venturi and open to the air at the other end to allow passage of gases therethrough, and a third pipe connected downstream from the connection of said first pipe to said second pipe for conducting a mixture of gas and liquid away from said venturi, the improvement comprising means connected to said discharge pipe for diverting a portion of said liquid flowing therein to said first pipe and through said venturi of said aerating device in a direction opposite to the flow of said liquid in said discharge pipe.

12. The system of claim 11 further including means located downstream from said diverting means for providing unidirectional flow in the discharge pipe.

13. The system of claim 12 wherein said means for providing said unidirectional flow is a check valve.

* * * * *

UNITED STATES PATENT AND TRADEMARK OFFICE
CERTIFICATE OF CORRECTION

PATENT NO. : 4,624,626

DATED : Nov. 25, 1986

INVENTOR(S) : David A. Sherfinski et al.        Page 1 of 3

It is certified that error appears in the above-identified patent and that said Letters Patent is hereby corrected as shown below:

IN THE REFERENCES CITED
U.S. PATENT DOCUMENTS

Please delete the following references:

| | | |
|---|---|---|
| 1,466,685 | 9/1923 | Warner |
| 1,488,987 | 4/1924 | Hulsey |
| 1,499,690 | 7/1924 | Pine et al. |
| 1,548,805 | 8/1925 | Mowrey |
| 1,574,292 | 2/1926 | Kelley |
| 1,832,346 | 11/1931 | Yerkes et al. |
| 1,840,493 | 1/1932 | Dyer et al. |
| 1,971,270 | 8/1934 | McGregor |
| 2,306,560 | 12/1942 | Pendleton |
| 2,371,846 | 3/1945 | Ruthven |
| 3,244,112 | 4/1966 | Parkin |

In the 3,265,370  8/1966 reference, please correct the spelling of "Scholfen" to --Scholten--.

IN THE ABSTRACT

In line 1, please delete "checkvalve" and substitute therefor --check valve--;

In line 3, please delete "checkvalve" and substitute therefor --check valve--.

UNITED STATES PATENT AND TRADEMARK OFFICE
CERTIFICATE OF CORRECTION

PATENT NO. : 4,624,626
DATED : Nov. 25, 1986
INVENTOR(S) : David A. Sherfinski et al.

It is certified that error appears in the above-identified patent and that said Letters Patent is hereby corrected as shown below:

IN THE BRIEF DESCRIPTION OF THE DRAWINGS

In column 1, line 65, please delete "venture" and substitute therefor --venturi--;

In column 2, line 3, please delete "cross sectional" and substitute therefor --cross-sectional--.

IN THE DETAILED DESCRIPTION OF THE INVENTION

In column 2, line 64, please delete "adaptor" and substitute therefor --adapter--;

In column 3, line 32, please delete "atomspheric" and substitute therefor --atmospheric".

IN THE CLAIMS

In Claim 1 (column 4, line 6), please delete "comprised of;" and substitute therefor
--comprised of:--

In Claim 4 (column 4, lines 55-56), please delete "means said for" and substitute therefor --means for--;

UNITED STATES PATENT AND TRADEMARK OFFICE
CERTIFICATE OF CORRECTION

PATENT NO. : 4,624,626

DATED : Nov. 25, 1986

INVENTOR(S) : David A. Sherfinski et al.

It is certified that error appears in the above-identified patent and that said Letters Patent is hereby corrected as shown below:

In Claim 10 (column 5, line 3), please delete "orifice in" and substitute therefor --orifice is--.

Signed and Sealed this

Thirty-first Day of May, 1988

Attest:

DONALD J. QUIGG

Attesting Officer  Commissioner of Patents and Trademarks